United States Patent [19]

Huffman et al.

[11] Patent Number: 4,565,424

[45] Date of Patent: Jan. 21, 1986

[54] ASYMMETRIC DICHROIC DYE MOLECULES HAVING POLY(ARYLAZO) LINKING GROUPS, A BIS-SUBSTITUTED ARYL THIAZYL END GROUP, AND ANOTHER END GROUP

[75] Inventors: William A. Huffman, Minneapolis; James C. Novack, Saint Paul, both of Minn.

[73] Assignee: Minnesota Mining and Manufacturing Company, Saint Paul, Minn.

[21] Appl. No.: 337,493

[22] Filed: Jan. 6, 1982

Related U.S. Application Data

[63] Continuation-in-part of Ser. No. 216,010, Dec. 12, 1980, abandoned.

[51] Int. Cl.$^4$ .................... C09B 31/053; C09B 31/18; C09B 31/28; C09B 31/30

[52] U.S. Cl. ................. 350/349; 252/299.1; 252/299.01; 252/299.61; 252/299.62; 252/299.68; 350/350 R; 534/754; 534/755; 534/757; 534/762; 534/763; 534/778; 534/788; 534/648

[58] Field of Search ............ 260/158; 252/299, 299.1, 252/299.01, 299.61, 299.62, 299.68; 350/349, 350 R; 534/754, 755, 757, 762, 763, 648

[56] References Cited

U.S. PATENT DOCUMENTS

| | | | |
|---|---|---|---|
| 70,421 | 11/1867 | Huffman . | |
| 2,149,051 | 2/1939 | Heinrich et al. | 260/158 |
| 2,659,719 | 11/1953 | Dickey et al. | 260/158 |
| 2,785,157 | 3/1957 | Straley et al. | 260/158 |
| 2,805,218 | 9/1957 | Towne et al. | 260/152 |
| 3,148,180 | 9/1964 | Straley et al. | 260/158 |
| 3,960,751 | 6/1976 | Moriyama et al. | 252/299 |
| 4,116,861 | 9/1978 | Aftergut et al. | 252/299 |
| 4,128,497 | 12/1978 | Cole, Jr. et al. | 252/299 |
| 4,137,193 | 1/1979 | Osman et al. | 252/299 |
| 4,141,627 | 2/1979 | Bloom | 350/349 |
| 4,145,114 | 3/1979 | Coates et al. | 350/349 |
| 4,154,746 | 5/1979 | Huffman | 260/378 |
| 4,179,395 | 12/1979 | Cole, Jr. et al. | 252/299 |

FOREIGN PATENT DOCUMENTS

| | | |
|---|---|---|
| 2155544 | 5/1973 | Fed. Rep. of Germany . |
| 140883 | 4/1980 | Fed. Rep. of Germany . |
| 2011940 | 7/1979 | United Kingdom . |

OTHER PUBLICATIONS

Masanobu Wada and Tatsuo Ochida in "GH-LCDs Make Bright Color Displays Possible," Japan Journal of Electronic Engineering, Nov. 1979.

Article Entitled, "New Absorptive Mode Reflective Liquid-Crystal Display Device," by Donald L. White and Gary N. Taylor in *Journal of Applied Physics*, vol. 45, No. 11, pp. 4718–4723, (Nov. 1974).

Article Entitled, "New Electrothermo-Optic Effect in a Certain Smectic Liquid Crystal with a Pleochroic Dye Added," by C. Tani and T. Ueno in *Applied Physics Letter*, vol. 33, No. 4, pp. 275–277, (Aug. 15, 1978).

*Primary Examiner*—Floyd D. Higel
*Attorney, Agent, or Firm*—Donald M. Sell; James A. Smith; Jennie G. Boeder

[57] ABSTRACT

A dichroic dyestuff having the formula $$Q-A-Z$$

wherein:
A is a poly(arylazo) linking group wherein the aryl comprises 6 to 10 carbon atoms and has 4,4'-azo linkages;
Q is a bis-substituted aryl thiazyl substituent wherein the aryl comprises 6 to 10 carbon atoms;
and
Z is selected from the group consisting of naphthalene having an alkyl substituted amino in the 4 position, 2,3-dihydro-2,2'-substituted-perimidine and julolidine groups;

forms guest-host combinations with nematic liquid crystals. These dichroic dyes have absorption maxima at wavelengths greater than 600 nanometers and transmit less than 50% of incident light having wavelengths between 600 and 700 nanometers. Thus these dyes, when combined with dichroic dyes which have absorption maxima between 400 and 600 nanometers, and nematic liquid crystals, are useful to provide electro-optical displays which change from clear to a neutral black color or vice versa when an electric field is applied to the electro-optical display.

19 Claims, 2 Drawing Figures

ASYMMETRIC DICHROIC DYE MOLECULES HAVING POLY(ARYLAZO) LINKING GROUPS, A BIS-SUBSTITUTED ARYL THIAZYL END GROUP, AND ANOTHER END GROUP

This application is a continuation-in-part of copending application Ser. No. 216,010, filed Dec. 12, 1980, now abandoned.

FIELD OF THE INVENTION

This invention relates to novel dichroic dyes and to guest-host combinations thereof with nematic liquid crystals. The novel dichroic dyes are asymmetric molecules having poly(arylazo) linking groups, bis-substituted aryl thiazyl end substituents, and either naphthyl, perimidine or julolidine end substituents. These dye compounds have absorption maxima at wavelengths greater than about 600 nanometers (nm) and transmit less than 50 percent of incident light having wavelengths between about 600 and 700 nm. This invention further relates to electro-optical devices employing guest-host combinations of these novel dichroic dyes and nematic liquid crystals. Use of the novel dichroic dyes with additional well-known dichroic dyes having absorption maxima between about 400 and 600 nm, in liquid crystal devices provide displays which alternate generally between a neutral black and a clear state when an electric field is present, or absent, respectively.

BACKGROUND OF THE INVENTION

The use of dichroic dyes in solution with various liquid crystal materials, and liquid crystal display devices incorporating such mixtures are well known in the art. These dichroic dye-liquid crystal mixtures may be used in "guest-host" type liquid crystal displays or, when an optically active additive is employed, in "phase-change" type liquid crystal displays. In both types of displays the host liquid crystal material has its orientation controlled by the application of electric fields and in turn interacts with the guest dichroic dye to induce a cooperative conforming alignment. The dichroic dye manifests low or high absorbance of incident light depending upon its molecular orientation with respect to the light wave vector. Thus, generally when an electric field is applied to the display, the area between the electrodes appears clear, i.e., all the dyes exhibit minimum absorption, and in the absence of an electric field the display appears characteristically dye colored, i.e., the dyes are in a high absorbing state.

It is desired to provide a liquid crystal display which appears neutral black in the absence of an electric field and clear or non-black in the presence of an electric field. In order to provide such neutral black appearing displays a plurality of dichroic dyes which together absorb strongly throughout the region between about 400 nm and 700 nm are required. Suitable dichroic dyes which have absorption maxima between about 400 and 600 nm are readily found in U.S. Pat Nos. 4,145,114; 4,128,497; 4,179,395 and in Applicants' copending U.S. Ser. No. 70,421. However, suitable dichroic dyes which absorb strongly between 600 and 700 nm are not so easily obtained. While there are available in the prior art dichroic dyes which absorb light having wavelengths in excess of 600 nanometers, they are deficient in one or more properties required for optimal performance in a liquid crystal display, i.e., they have inadequate solubilities in liquid crystal material, they are chemically, photochemically or electrochemically unstable, e.g., they are degraded by ultraviolet radiation, they have relatively low extinction coefficients, i.e., less than $2 \times 10^4$, or they have relatively low optical order parameters, i.e., less than 0.65. For example, U.S. Pat. Nos. 3,960,751; 4,154,746; and U.K. patent application GB 2,011,940 A disclose a number of anthraquinone type pleochroic dyes which have absorption maxima very close to about 600 nanometers. However, anthraquinone type dyes have optical order parameters generally less than 0.65. The optical order parameters are measures of the efficiency with which the dichroic dye is oriented by the liquid crystal material and is directly related to the contrast one observes when viewing the device. In general, dyes having optical order parameters close to 1 are desired since they produce guest-host displays having high contrast, i.e. approximately 10 to 1 and greater.

U.S. Pat. Nos. 4,128,497 and 4,145,114 disclose poly(arylazo) type pleochroic dyes having absorption maxima at wavelengths in the range of from about 590 nanometers to about 620 nanometers. While these dyes have optical order parameters in excess of 0.5, in general they lack stability, i.e., they are degraded by ultraviolet radiation, and they have solubilities in liquid crystal materials of less than 1% by weight.

Masanobu Wada and Tatsuo Uchida in "GH-LCDs Make Bright Color Displays Possible," Japan Journal of Electronic Engineering, November, 1979, disclose several substituted benzothiazyl poly(arylazo) dichroic dyes for use in guest-host liquid crystal displays. These dyes have, in general, lower optical order parameters, i.e., less than 0.65, lower absorption between 600 and 700 nm, i.e., less than 0.3, and lower extinction coefficients, i.e., less than $5 \times 10^4$, than the dyes of the present invention.

SUMMARY OF THE INVENTION

The novel dichroic dyes of the present invention are useful in providing black/clear liquid crystal displays since they have absorption maxima at wavelengths greater than 600 nanometers and transmit less than 50% of incident light having a wavelength of from 600 up to 700 nanometers. Additionally, the dichroic dyes of the present invention suffer from none of the deficiencies referred to hereinabove in connection with the dichroic dyes of the prior art. The dyes of the present invention have optical order parameters greater than about 0.72; they have extinction coefficients greater than about $5.5 \times 10^4$; they have solubilities in nematic liquid crystal materials, in excess of about 2 percent by weight; and they have good chemical, photochemical and electrochemical stability. For example, they are relatively resistant to ultraviolet radiation, they are resistant to degradation produced by electric currents, and they are not degraded by liquid crystal materials.

DETAILED DESCRIPTION

Figure 1:
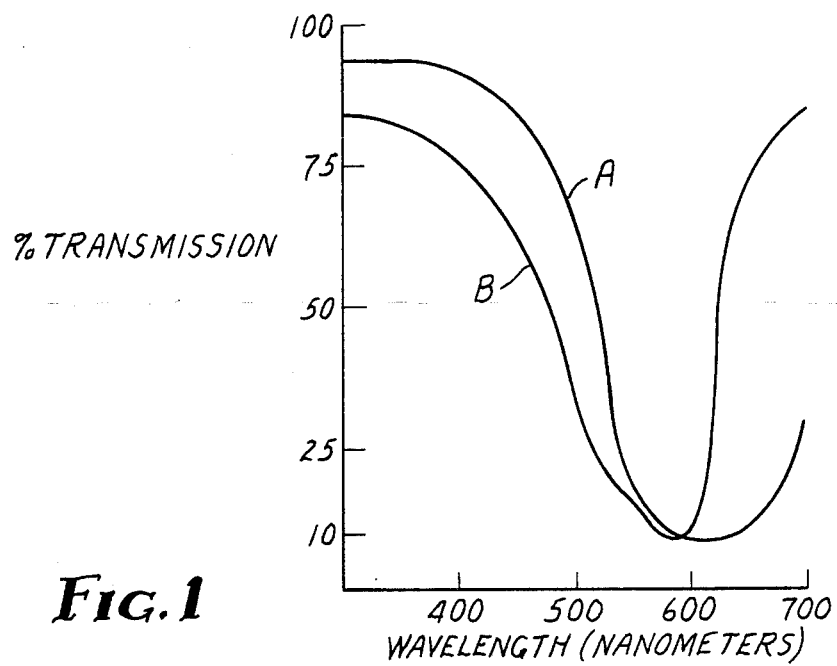
FIG. 1 is a graphic presentation comparing absorbance characteristics of a dichroic dye of the present invention with a closely related dichroic dye of the prior art.

The novel dichroic dyes of the present invention can be represented by the general formula:

Q—A—Z wherein:
A is a poly(arylazo) linking group, having at least two —N═N— groups;
Q is a bis-substituted aryl thiazyl substituent; and
Z is selected from the group consisting of 4-amino substituted naphthalene, substituted 2,3-dihydroperimidine, or julolidine groups.

Preferred poly(arylazo) linking groups, A, are substituted aryl moieties with 4,4'-azo linkages, having the general formula

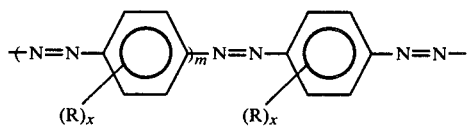

wherein m is 0 or an integer between about 0–6, and x is independently 0, 1, 2 or 4, provided that when x is 2 or 4, the R groups are independently selected from alkyl or alkoxy groups having from about 1 to 8 carbon atoms, and when X is 2, the two R groups are not substituted on adjacent ring carbon atoms. Where X is 1, R is the group —C═CH—CH═CH—, which is substituted on two adjacent ring carbon atoms, so that the aromatic nucleus is a naphthalene group. It is preferred that there be no more than m naphthalene groups in the molecule.

Preferred Q groups are of the formula

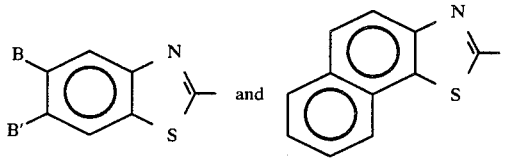

wherein B and B' are independently selected from the group consisting of H, $C_nH_{2n+1}$, $OC_nH_{2n+1}$, phenyl, phenoxy, trifluoromethylsulfonyl, cyano, and thiocyanato substituents, wherein n is an integer from about 1 to 10, preferably from about 1 to 8. Alternatively, B and B' together represent the group —CH$_2$—CH$_2$—CH$_2$—, which, together with the ring carbons of the benzo group, forms a fused cycloaliphatic five membered ring.

Preferred Z groups include 4-amino substituted naphthalene groups of the formula

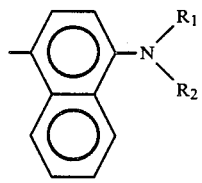

wherein $R_1$ is H or $C_nH_{2n+1}$, and $R_2$ is $C_nH_{2n+1}$, wherein n is an integer from about 1 to 20, preferably from about 1 to 6. Throughout this application $C_nH_{2n+1}$ represents either a linear or branched alkyl group.

Preferred 2,3-dihydroperimidene Z substituents are of the general formula:

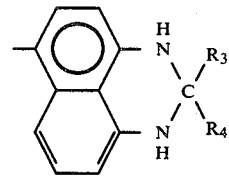

wherein the number two carbon of the perimidine moiety is substituted with substituents $R_3$ and $R_4$ which are independently selected from groups such as alkyl, alkene, aryl, cycloaliphatic and heterocyclic substituents. Alternatively, $R_3$ and $R_4$ are combined and, together with the 2 carbon of the perimidine moiety, form cycloaliphatic or heterocyclic rings. Preferably the alkyl or alkene substituents are comprised of about 1 to 20 carbon atoms, most preferably about 1 to 6 carbon atoms. Preferred cycloaliphatic and heterocyclic rings comprise about 4 to 12 carbon atoms, most preferably about 5 or 6 carbon atoms. The heterocyclic rings may contain nitrogen, sulfur or oxygen atoms. Additionally, the cycloaliphatic and heterocyclic rings may be substituted in available positions by lower alkyls having about 1 to 8 carbon atoms.

Exemplary of preferred substituted 2,3-dihydroperimidine Z groups are the following:

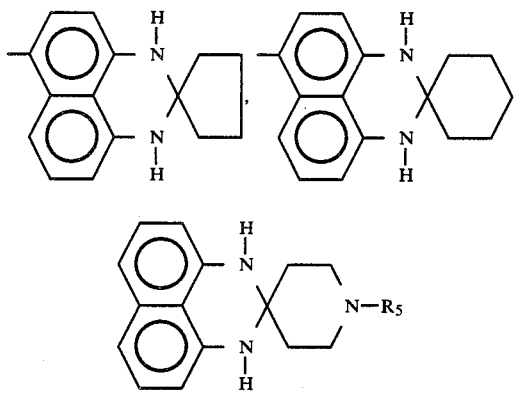

wherein $R_5$ represents a lower alkyl group having about 1 to 6 carbon atoms.

Other preferred substituted 2,3-dihydroperimidine Z groups include
2,2'-diethyl-2,3-dihydroperimidine;
2-methyl-2'-isobutyl-2,3-dihydroperimidine;
2-methyl-2'-ethyl-2,3-dihydroperimidine;
2,2'-tetramethylene-2,3-dihydroperimidine;
2,2'-pentamethylene-2,3-dihydroperimidine;
2,2'-(4'-N-methyl-tetramethylene)-2,3-dihydroperimidine;
2-methyl-2'-dodecane-2,3-dihydroperimidine;
2-methyl-2'-hexahydro-farnesylmethylene-2,3-dihydroperimidine;
2,2'-diisobutyl-2,3-dihydroperimidine; and
2,2'-dimethyl-2,3-dihydroperimidine.

Preferred julolidine Z groups include

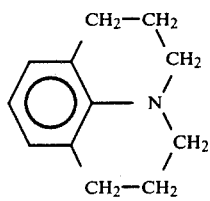

Exemplary of the preferred dichroic dyes are the following:

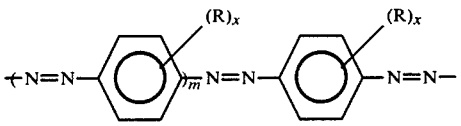

x is 1, 2 or 4, m is at least 1, and R is defined as it was hereinabove, such that there are at least three —N=N— groups and at least two substituted aromatic rings lying in the plane of the molecule. Exemplary of the particularly preferred dichroic dyes are the following:

| Dye No. | Dye Structure |
|---|---|
| 1 | ![Dye 1 structure] |
| 2 | ![Dye 2 structure] |
| 3 | ![Dye 3 structure] |
| 4 | ![Dye 4 structure] |
| 5 | ![Dye 5 structure] |

In the particularly preferred dichroic dyes, the A group is of the formula

| Dye No. | Dye Structure |
|---|---|
| 6 | 4-methylbenzothiazol-2-yl—N=N—(2,5-dimethylphenyl)—N=N—(2,5-dimethylphenyl)—N=N—naphthyl-NH—CH₂CH₃ |
| 7 | 4,5-dimethylbenzothiazol-2-yl—N=N—(2,5-dimethylphenyl)—N=N—naphthyl—N=N—naphthyl-NH—CH₂CH₂CH₃ |
| 8 | indanobenzothiazol-2-yl—N=N—(2,5-dimethylphenyl)—N=N—(2-methoxy-5-methylphenyl)—N=N—naphthyl-NH—CH₃ |
| 9 | 5-ethoxybenzothiazol-2-yl—N=N—(2,5-dimethylphenyl)—N=N—(2,5-dimethoxyphenyl)—N=N—(1,5-diaminonaphthyl substituted with C(CH₃)₂CH₂CH₃) |
| 10 | 4,5-dimethylbenzothiazol-2-yl—N=N—naphthyl—N=N—(2,5-dimethylphenyl)—N=N—naphthyl-NH—CH₃ |
| 11 | 4,5-dimethylbenzothiazol-2-yl—N=N—(2,5-dimethylphenyl)—N=N—(2,5-dimethylphenyl)—N=N—(2,5-dimethylphenyl)—N=N—naphthyl-NH—CH₂CH₃ |
| 12 | naphtho[2,1-d]thiazol-2-yl—N=N—(2,5-dimethylphenyl)—N=N—(2,5-dimethylphenyl)—N=N—naphthyl-NH—CH₂CH₃ |

The dichroic dyes of this invention may be synthesized using methods of diazotization normally employed to synthesize polyazo dyes. The literature abounds with methods of diazotization and specific organic synthetic procedures relating to diazotization and coupling reaction schemes. A preferred synthetic scheme is direct diazotization of the appropriate substituted 2-amino-benzothiazole in strong mineral acid, followed by coupling the resultant diazo compound to the appropriate substituted aniline. Diazotization and coupling are repeated as desired and the intermediate product is recovered from a buffered aqueous solution as the free base. The free base is subsequently diazotized and coupled with the desired Z group in acid. The resultant dichroic dye is recovered from the neutralized solution by filtration and is purified by column chromatography. An example of this method is illustrated below:

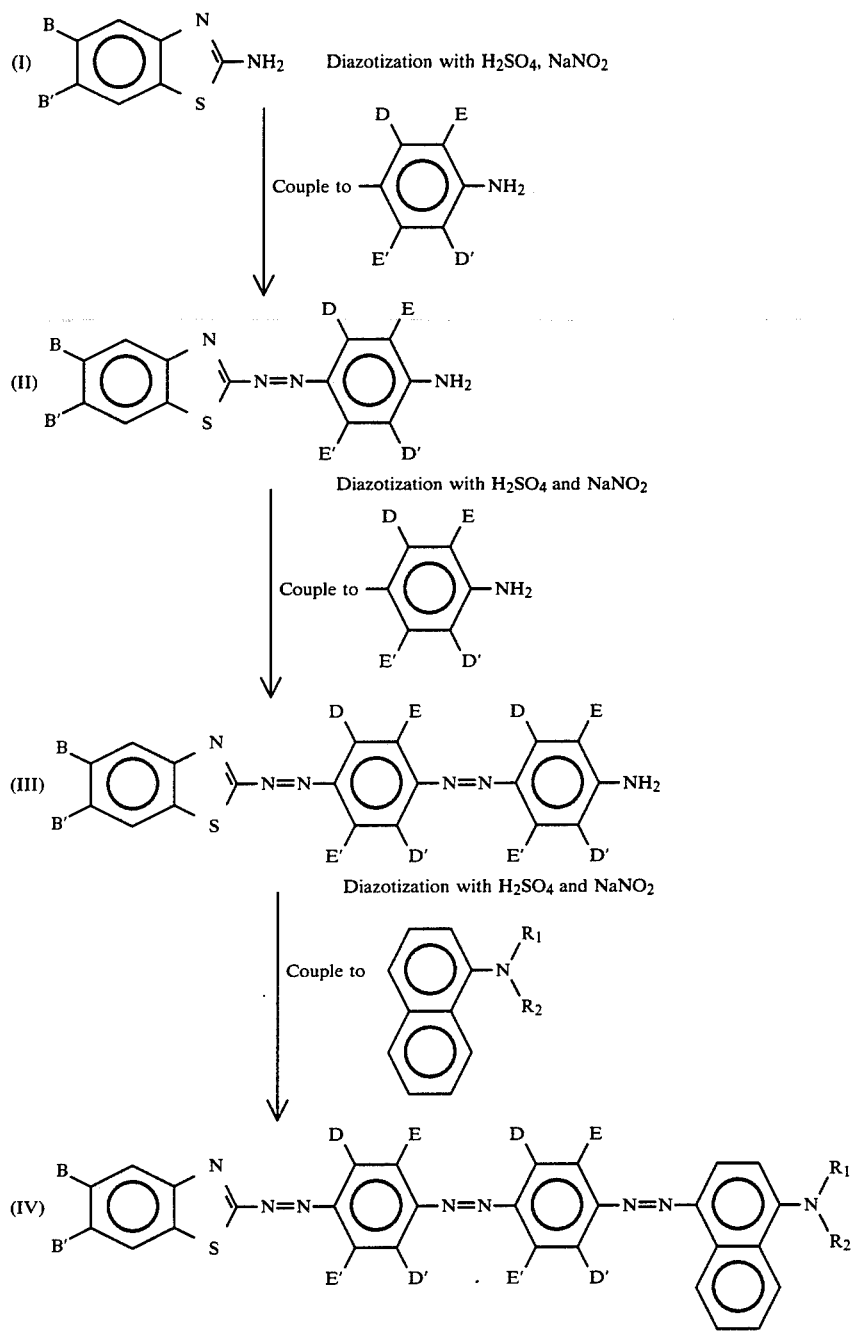

D, E, D', and E' represent substituents independently selected from the group consisting of H, $C_nH_{2n+1}$ and $OC_nH_{2n+1}$, wherein n is an integer from about 1 to 8. B, B', $R_1$ and $R_2$ are defined hereinabove.

The dye intermediate II above may also be made by the method of Seele et al, as taught in German Pat. No. 140,883, incorporated herein by reference, via the appropriate benzothiazole-2-diazotate.

The dichroic dyes of the present invention are blue in color, have absorption maxima at wavelengths greater than about 600 nanometers, and transmit less than about 50% of incident light having wavelengths from 600 nm up to about 700 nanometers. The preferred dichroic The following arylazo and poly(arylazo) dyes, including several dyes which contain bis-substituted aryl thiazyl substituents are known in the art.

| Dye No. | Dye Structure | Prior Art Disclosing Dye |
|---|---|---|
| 13 | (benzothiazole)–N=N–(phenyl)–N(C2H5)2 | U.S. Pat. No. 2,785,151 |
| 14 | (benzothiazole)–N=N–(naphthyl)–NH2 | U.S. Pat. No. 2,149,051 |
| 15 | H5C2O–(benzothiazole)–N=N–(naphthyl)–NH(CH2CH3) | U.S. Pat. No. 2,785,154 |
| 16 | (benzothiazole)–N=N–(naphthyl, HO-)–NH2 | U.S. Pat. No. 2,145,051 |
| 17 | O2N–(thiazole)–N=N–(phenyl)–N(CH3)2 | U.S. Pat. No. 4,145,114 |
| 18 | O2N–(thiazole)–N=N–(phenyl)–NH(CH2CH3) | U.S. Pat. No. 2,785,237 |
| 19 | H5C2O–(benzothiazole)–N=N–(phenyl)–N=N–(phenyl)–N(CH2CH3)2 | Japan Journal of Electronic Engineering Nov. 1979, p. 26 |
| 20 | O2N–(benzothiazole)–N=N–(phenyl)–N=N–(phenyl)–N(CH2CH3)2 | Japan Journal of Electronic Engineering Nov. 1979, p. 26 | dyes have absorption maxima at wavelengths greater than about 610 nm. The absorption maxima for several of the preferred dyes (Dye Numbers 1–6) are shown in Table I, hereinbelow. The particularly preferred dyes have absorption maxima at wavelengths greater than about 620 nm and transmit less than about 40% of incident light having wavelengths from about 600 nm up to about 700 nm. Absorption maxima and percent transmission of light having a wavelength of 700 nm for several of the particularly preferred dyes (Dye Numbers 6–11) are shown in Table II, hereinbelow.

Absorption maxima and percent transmission of 700 nm wavelength light for these prior art dyes are shown in Table III, hereinbelow. Absorption maxima for these closely related dyes are less than about 600 nm. Additionally the percent transmission of 700 nm wave length light is greater than about 75%.

FIG. 1 compares the absorbance characteristics of Dye Number 2,

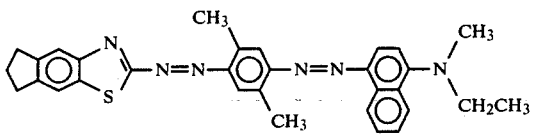

with a closely related dye, Dye Number 16,

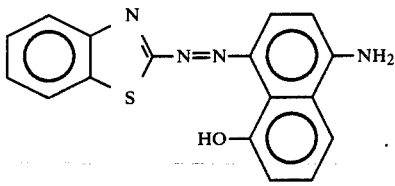

Curve A is the spectra of Dye Number 2, at a concentration of 0.4 percent by weight in an eutectic mixture of biphenyl pyrimidine liquid crystals commercially available as "ROTN 404" from Hoffman LaRoche. Curve B is the spectra of Dye Number 16, at a concentration of 0.7 percent by weight in "ROTN 404". While Dye Number 16 has an absorption maximum close to 600 nm, its percent transmission at 625 nm increases to more than about 50%, with a percent transmission at 700 nm of about 80%. Dichroic dyes which have percent transmissions of more than about 50% at wavelengths beyond 625 nm are not useful for providing black/clear liquid crystal displays.

The dyes of the present invention have, in general, relatively high values of the optical order parameter S. This parameter is a measure of the efficiency with which the compound is oriented by the liquid crystal material and is directly related to the contrast one observes when viewing the device. In general, dyes having high optical order parameters produce displays having high optical contrasts. The determination of the optical order parameter, S, is discussed in Journal of Applied Physics, Vol. 45, No. 11, 4718-23 (1974).

$$S = \frac{A_o - A_1}{A_o + 2A_1}$$

wherein $A_o$ is the absorbance in the absence of an electric field and $A_1$ is the absorbance in the presence of an electric field. S is a value something less than 1 and preferably is very close to 1. Values of S greater than 0.5 and preferably greater than 0.65 insure contrasts of between 5:1 and 10:1. The dyes of the present invention have values of S greater than about 0.72, insuring optical contrast ratios on the order of at least about 10:1. The preferred dyes have S values greater than about 0.75 and the particularly preferred dyes have S values greater than about 0.78. The S values for several of the preferred dyes (Dye Numbers 1-6) are shown in Table I and the S values for several of the particularly preferred dyes (Dye Numbers 7-11) are shown in Table II. Closely related arylazo and poly(arylazo) dyes (Dye Numbers 13-20) have S values no greater than about 0.72. S values for several of the closely related dyes are shown in Table III hereinbelow.

The dyes of the present invention have relatively high extinction coefficients, when compared with similar arylazo and poly(arylazo) dyes of the prior art. The molar extinction coefficient is a measurement of the extent to which the dye absorbs light at any particular molar concentration. Therefore, the dyes of the present invention, with higher molar extinction coefficients provide displays with better brightness characteristics, at any particular molar concentration of dichroic dye, than do the dyes of the prior art which have relatively lower molar extinction coefficients. Additionally, the dyes of the present invention, due to their higher molar extinction coefficients, may be utilized in lower molar concentrations than the dichroic dyes of the prior art to produce liquid crystal displays having similar absorbances. For instance, the dichroic dyes of the prior art are in general required to be present in concentrations of from approximately 1 to 5% by weight of the guest-host composition. In contrast, the dichroic dyes of the present invention need be present in concentrations of only about ½ to 2% by weight to provide sufficient absorption in one of the oriented states to display its characteristic color.

The extinction coefficients of the dyes of the present invention are generally greater than about $5.5 \times 10^4$. The particularly preferred dyes have extinction coefficients generally greater than about $1 \times 10^5$. The extinction coefficients for several of the particularly preferred dyes (Dye Numbers 7-11) are shown in Table II, hereinbelow. Closely related arylazo and poly(arylazo) dyes (Dye numbers 13-20) have extinction coefficients no greater than $5.5 \times 10^4$. The extinction coefficients for several of the closely related dyes are shown in Table III, hereinbelow.

The dyes of the present invention have been found to show improved stability, both chemical and photochemical stability, compared with known dichroic dyes containing chains of azo-linked phenyl rings. For example, when several of the particularly preferred dyes of the present invention (Dye Numbers 6-11) were present in a 20 μm thick liquid crystal display test cell, at a concentration of 1% by weight in the liquid crystal material, "ROTN 404", and exposed to ultraviolet radiation supplied by a Type 509/10, 500 watt ultraviolet lamp, available from Hanovia, at 21° C., the time required for the dyes to lose 50% of the value of their optical order parameters, S, was greater than 500 hours. When closely related arylazo and poly(arylazo) dichroic dyes (Dye Numbers 13-20) were tested in the identical manner the time required for their S values to be reduced one-half was always less than 350 hours, and in several cases was less than 200 hours (see Table III).

In order for dichroic dyes to be useful in liquid crystal display devices, the dye molecule, in addition to having a high optical order parameter and stability, must have suitable solubility in the host liquid crystal material. Solubilities of greater than about 1 percent by weight insure that the dye will have sufficient absorption in one of the oriented states to be useful in displaying its characteristic color. The dyes of the present invention have solubilities in nematic liquid crystals of greater than about 2 percent by weight. The particularly preferred dyes have solubilities in "ROTN 404" nematic liquid crystal material of greater than about 3 percent by weight. The solubilities in "ROTN 404" for several of the particularly preferred dichroic dyes of the present invention (Dye Numbers 6-11) are shown in Table II, hereinbelow.

TABLE I

Properties of Preferred Dyes

| Dye No. | $\lambda_{max}$ in E7[1] | S in E7[1] |
|---|---|---|
| 1 | 625 ± 5 nm | 0.72 |
| 2 | 630 ± 5 nm | 0.76 |
| 3 | 620 ± 5 nm | 0.78 |
| 4 | 610 ± 5 nm | 0.75 |
| 5 | 615 ± 5 nm | 0.72 |

[1]"E7" is a eutectic mixture of lower alkyl and alkoxy cyanobiphenyls and terphenyl liquid crystals commercially available from E. Merck Co.

TABLE II

Properties of Particularly Preferred Dyes

| Dye No. | Optical Order Parameter (S) in E7[1] | in E38[2] | in PCH 1132[2] | in ROTN 404[4] | $\lambda_{max}$ ROTN 404[4] | in dimethyl formamide | % T 700 nm | Solubility in ROTN 404[4] (percent by wt.) | Stability[5] (hours) |
|---|---|---|---|---|---|---|---|---|---|
| 6  | 0.78 | 0.78 | 0.80 | 0.78 | 620 ± 5 nm | 1.1 × 10⁵ | 40 | 3.0 | >500 |
| 7  | 0.80 | 0.80 | 0.84 | 0.82 | 625 ± 5 nm | 2.0 × 10⁵ | 32 | 4.0 | >500 |
| 8  | 0.80 | 0.82 | 0.85 | 0.85 | 620 ± 5 nm | 1.0 × 10⁵ | 28 | >4.0 | >500 |
| 9  | 0.78 | 0.82 | 0.80 | 0.80 | 630 ± 5 nm | 2.5 × 10⁵ | 25 | 2.2 | >500 |
| 10 | 0.80 | 0.83 | 0.85 | 0.85 | 625 ± 5 nm | 1.9 × 10⁵ | 35 | 2.5 | >500 |
| 11 | 0.82 | 0.82 | 0.88 | 0.85 | 640 ± 5 nm | 3.3 × 10⁵ | 12 | 1.9 | >500 |

[1]"E7" is a eutectic mixture of lower alkyl and alkoxy cyanobiphenyls and terphenyl liquid crystals commercially available from E. Merck Co.
[2]"E38" is a eutectic mixture of lower alkyl and alkoxy cyanobiphenyls and terphenyl liquid crystals commercially available from E. Merck Co.
[3]"PCH 1132" is a eutectic mixture comprising by weight approximately 14% trans-4-n-pentyl-(4'-cyanobiphenyl)cyclohexane, 26% trans-4-n-propyl-(4'-cyanophenyl)cyclohexane, 36% trans-4-n-pentyl-(4'-cyanophenyl)cyclohexane, and 24% trans-4-n-heptyl-(4'-cyanophenyl)-cyclohexane, commercially available from E. M. Laboratories, Inc.
[4]"ROTN 404" is a eutectic mixture of biphenylpyrimidine liquid crystals commercially available from Hoffman LaRoche.
[5]Time in hours required for a 1% by weight solution of the dye in "ROTN 404" in a 20 μm thick liquid crystal display test cell to lose 50 percent of the value of its optical order parameter (S) when exposed to ultraviolet radiation supplied by a type 509/10, 500 watt ultraviolet lamp, available from Hanovia, at 21° C.

TABLE III

Properties of Known Dyes

| Dye No. | Optical Order Parameter (S) in E7[1] | in E38[2] | in PCH 1132[3] | in ROTN 404[4] | $\lambda_{max}$ in ROTN 404[4] | in dimethyl formamide | % T 700 nm | Stability[5] (hours) |
|---|---|---|---|---|---|---|---|---|
| 13 | 0.58 | 0.59 | 0.60 | 0.60 | 545 ± 5 nm | 3.3 × 10⁴ | 100 | 275 |
| 14 | 0.56 | 0.58 | 0.58 | 0.60 | 575 ± 5 nm | 2.5 × 10⁴ | 90  | 325 |
| 15 | 0.64 | 0.64 | 0.67 | 0.67 | 580 ± 5 nm | 2.8 × 10⁴ | 88  | 250 |
| 16 | 0.62 | 0.64 | 0.64 | 0.65 | 578 ± 5 nm | 2.0 × 10⁴ | 80  | 300 |
| 17 | 0.72 | 0.70 | 0.72 | 0.74 | 585 ± 5 nm | 5.0 × 10⁴ | 80  | <200 |
| 18 | 0.68 | 0.70 | 0.70 | 0.72 | 590 ± 5 nm | 4.8 × 10⁴ | 90  | 250 |
| 19 | 0.72 | 0.74 | 0.72 | 0.75 | 580 ± 5 nm | 4.4 × 10⁴ | 85  | 350 |
| 20 | 0.72 | 0.72 | 0.0  | 0.75 | 595 ± 5 nm | 5.5 × 10⁴ | 85  | 275 |

[1]"E7" is a eutectic mixture of lower alkyl and alkoxy cyanobiphenyls and terphenyl liquid crystals commercially available from E. Merck Co.
[2]"E38" is a eutectic mixture of lower alkyl and alkoxy cyanobiphenyls and terphenyl liquid crystals commercially available from E. Merck Co.
[3]"PCH 1132" is a eutectic mixture comprising by weight approximately 14% trans-4-n-pentyl-(4'-cyanobiphenyl)cyclohexane, 26% trans-4-n-propyl-(4'-cyanophenyl)cyclohexane, 36% trans-4-n-pentyl-(4'-cyanophenyl)cyclohexane, and 24% trans-4-n-heptyl-(4'-cyanophenyl)-cyclohexane, commercially available from E. M. Laboratories, Inc.
[4]"ROTN 404" is a eutectic mixture of biphenylpyrimidine liquid crystals commercially available from Hoffman LaRoche.
[5]Time in hours required for a 1% by weight solution of the dye in ROTN 404 in a 20 μm thick liquid crystal display test cell to lose 50 percent of its S value when exposed to ultraviolet radiation supplied by a type 509/10, 50 watt ultraviolet lamp, available from Hanovia, at 21° C.

The dichroic dyes of the present invention are capable of being aligned by nematic liquid crystal materials and, thus, are suitable for use in electro-optic liquid crystal display devices.

The host liquid crystal material may be any liquid crystal compound or mixture of liquid crystal compounds which are per se known in the art. The nematic liquid crystals can have either positive or negative dielectric anisotropy. As used herein the term "positive" or "negative" refers to the net dielectric anisotropy where mixtures are used. Generally liquid crystals having higher absolute values of dielectric constant are preferred. At this time the positive nematic materials having high dielectric constants are more readily available and for convenience are referred to for purposes of illustration herein. Mixtures of positive and negative materials are also useful, particularly those mixtures having a net positive dielectric anisotropy.

Readily available positive nematic liquid crystal materials which have been found suitable are trans-4-n-pentyl-(4'-cyano-phenyl)-cyclohexane, trans-4-n-pentyl-(4'-cyano-biphenyl-4)-cyclohexane, p-n-hexylbenzylidene-p'-amino-benzonitrile, p-methoxybenzylidene-p'-amino-benzonitrile, p-ethoxybenzylidene-p'-amino-benzonitrile, p-cyano-benzylidene-p'-n-butyoxyaniline, p-cyanobenzylidene-p'-octyloxyaniline, 4-cyano-4'-alkyl(or alkoxy)biphenyl, 4-cyanophenyl-4'-alkyl(or alkoxy)benzoate, 4-alkyl(or alkoxy)phenyl-4'-cyanobenzoate and including the family of alkyl phenyl pyrimidines.

Eutectic mixtures and combinations of all the above are also useful. Illustrative are eutectic mixtures of 4'-substituted-4-cyanobiphenyl wherein the 4' substituents are alkyl or alkoxy of 3 to 8 carbon atoms, and terphenyl liquid crystals. Representative is the commercially available "E7" mixture from B.D.H. Ltd. Another useful mixture is commercially available from Hoffman LaRoche under the trade name "ROTN 404". "ROTN 404" is a eutectic mixture of biphenyl pyrimidine liquid crystals. Yet another useful mixture of compounds comprises mixtures of the phenylcyclohexanes referred to above such as mixtures comprising the 4-alkyl-(4'-cyanophenyl)cyclohexanes, mixtures comprising 4-alkyl-(4'-cyanobiphenyl)cyclohexanes, and mixtures comprising both types of compounds. One useful commercial mixture is a four-component mixture available from EM Laboratories, Inc., identified as Nematic Phase 1132 TNC "Licristal" or "PCH 1132". This mixture comprises by weight approximately :

14% trans-4-n-pentyl-(4'-cyanobiphenyl)cyclohexane,
26% trans-4-n-propyl-( 4'-cyanophenyl)cyclohexane,
36% trans-4-n-pentyl-(4'-cyanophenyl)cyclohexane, and
24% trans-4-n-heptyl-(4'-cyanophenyl)cyclohexane.

Other positive nematic materials and compositions useful in the practice of the present invention are phenylbenzoate esters, available under the trade name "EK-11650" from Eastman Organic Chemicals, Eastman Tennessee, and "ZLI" from E. Merck, Darmstadt, Germany; and compositions including these compounds in dominating amounts such that the compositions are provided with a net dielectrically positive anisotropy.

Representative of nematic liquid crystals having negative dielectric anisotropy which would be useful in the present invention is the liquid crystal "EN-18" available from Chisso Corporation.

Liquid crystal display devices of the present invention are similar to liquid crystal display devices of the prior art in that they comprise two plates of glass of nominal thickness spaced from a few microns to a few tens of microns apart in a parallel configuration. A spacer or confining gasket material is placed between the two glass plates around the periphery in order to form an airtight, substantially water impermeable bond with the glass surfaces. The inner surfaces of each glass plate are coated with a thin film of, for example, indium/tin oxide to form a conductive electrode surface. The electrode pattern which is desired may be produced by silk-screen or photolithographic techniques which are well-known in the art. The surfaces of each inwardly facing electrode pattern are treated using techniques known in the art to insure that the fill mixture is homogeneously or homeotropically oriented. For "guest-host" displays using host positive nematic liquid crystal material homogeneous orientation is used. For "phase-change" displays either homogeneous or homeotropic alignment are useful. However, homeotropic alignment is preferred, i.e., that the molecules are aligned perpendicular to the electrode surfaces. Generally, methods of homeotropic orientation comprise coating of the cell inner walls with an agent such as an organosilane coupling agent, a polymer surfactant, or metal oxides, such as silicon monoxide, at angles of greater than about 20° to the surface.

The dichroic dyes of the present invention may be utilized in both "guest-host" and "phase-change" type liquid crystal displays. The construction of "guest-host" liquid crystal displays is described in *Applied Physics Letters*, Vol. 13, pages 91-92 (1968). "Phase-change" type displays are described in D. L. White and G. N. Taylor, "New Absorptive Mode Reflective Liquid Crystal Display Device," *Journal of Applied Physics.* Vol. 45, pp. 4718-4723, (1974). Briefly both "guest-host" and "phase-change" types of devices comprise a typical transmissive or reflective liquid crystal display cell having appropriate front and back electrode patterns and featuring a homogeneously or homeotropically oriented liquid crystal layer comprising host positive nematic liquid crystal, and a guest dichroic dye. In "phase-change" type displays an optically active additive is present in amounts sufficient to provide a cholesteric or helically ordered liquid crystal phase. The "host" liquid crystal material has its orientation controlled by the application of electrical fields and in turn interacts with "guest" dichroic dye molecules to induce a cooperative conforming alignment.

Normally, "guest-host" type displays in the "off" state require one polarizer to absorb one polarization of incident light while the guest dichroic material in the display absorbs the other polarization. In the "on" or "bright" state the host liquid crystal material, and thus the guest dye molecules, are oriented by the electric field so that the dichroic dye molecules assume their essentially nonabsorbing state.

In "phase-change" type displays the helical ordering of the host liquid crystal material is superimposed upon the dichroic dye. The helically ordered dichroic dye is thus able to absorb both polarizations of incident light thereby producing a brighter display since no auxiliary polarizers are required, as they are in the traditional "twist-nematic" or "guest-host" type displays. In the absence of an electric field across the display electrodes, the dichroic dye is oriented to absorb a substantial amount, e.g. 95%, of the unpolarized incident light and the display area exhibits a color characteristic of the dichroic dye. When an electric field is applied to the desired electrode, the liquid crystal layer in register with the electrode is caused to change from a cholesteric phase to a nematic phase in homeotropic alignment due to the positive dielectric anisotropy of the liquid crystal host material. In this state, the dichroic dye in the liquid crystal layer is oriented to absorb relatively little incident light and a "clear" area, corresponding to the electrode area on a colored background, is observed. By selective activation of the electroes, information can be readily displayed.

The concentration of dichroic dye which is useful in "guest-host" and "phase-change" type liquid crystal displays is between about 0.5 and 5 percent by weight of the liquid crystal material. A preferred concentration is between 1 and 2 percent by weight in order to achieve optimal contrast and brightness. Of course, the maximum amount of dichroic dye which can be present is dependent upon the solubility of the dye in the liquid crystal materials.

The dichroic dyes of the present invention when combined with various dichroic dyes of the prior art may be used to prepare mixtures which absorb throughout the visible spectrum between about 400 nm and 700 nm, resulting in neutral, black-appearing mixtures. When these mixtures are used in "guest-host" type or "phase- change" type liquid crystal devices a display which alternates between black ($V=0$) and clear ($V>0$) can be provided. It is preferred to select the various dichroic dyes so that when combined they absorb light uniformly throughout the region between 400 and 700 nm. It is also preferred that all of the dyes have optimal order parameters (S) of about 0.7 or higher in order to insure displays having high contrasts and brightness.

Suitable dichroic dyes of the prior art which have absorption maxima between about 400 and 600 nm are of the well-known azo, azomethine, anthraquinone and polyazo type. Exemplary dyes are disclosed in U.S. Pat. Nos. 4,145,114; 4,128,497; 4,179,395; and in Applicants' copending U.S. Ser. No. 70,421 filed Aug. 28, 1979. It is preferred to have these known dyes present in concentrations which will cause absorption of light in the region between 400 and 600 nm at least equivalent to the absorption of light in the region between 600 and 700 nm caused by the dyes of the present invention. This is accomplished by adjusting the concentration of each individual dye so that the absorbance at the wavelength of maximum absorption ($\lambda_{max}$) for each dye is approximately equal.

Figure 2:
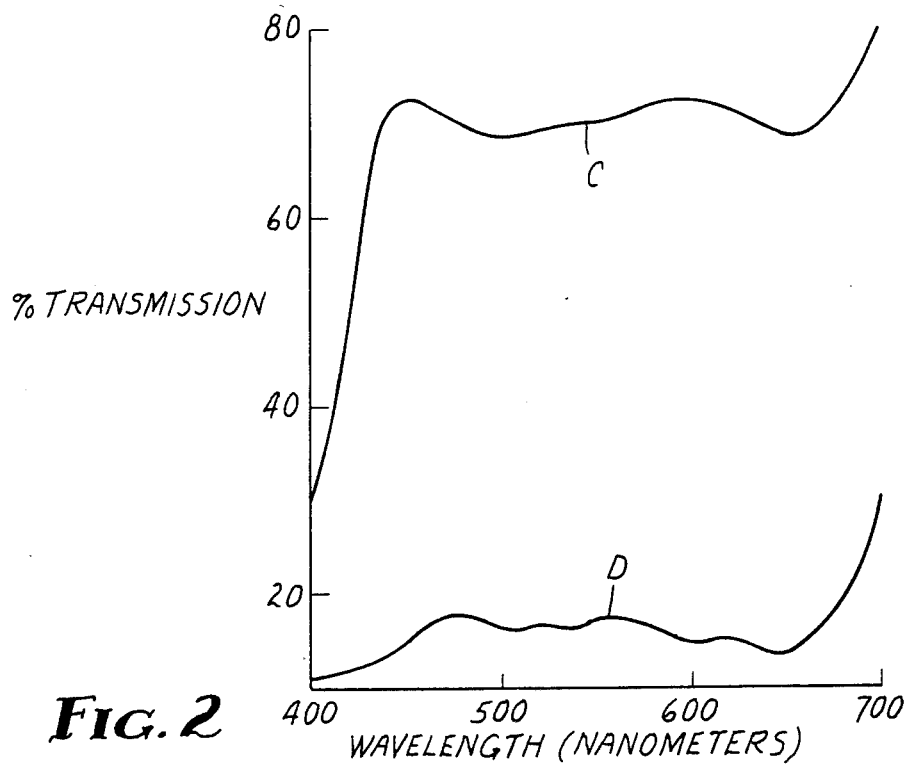
FIG. 2 illustrates the absorbance characteristics of a black/clear "phase-change" type liquid crystal display device utilizing one of the dichroic dyes of the present invention.

Examplary well-known dichroic dyes which are useful when combined in the proper ratio with the dyes of the present invention are:

FIG. 2 shows the transmission spectra of a "phase-change" liquid crystal display employing four dichroic dyes, one of which is a dye of the present invention, in "ROTN-404" liquid crystal material a eutectic mixture of biphenyl pyrimidine liquid crystals commercially available from Hoffman LaRoche, and 4% by weight cholesteric additive +4(2methylbutyl)-4'-cyano biphenyl commercially available as "CB -15" from B. D. H. Ltd. The four dyes are:

| Dye | $\lambda_{max}$ (nm) | S |
|---|---|---|
|  | 440 | 0.78 |
| 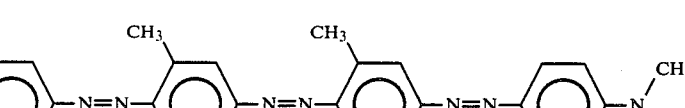 | 505 | 0.75 |
| 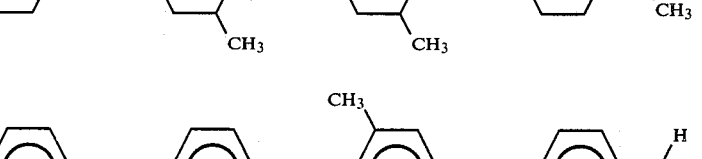 | 585 | 0.78 |
|  | 420 | 0.73 |
| 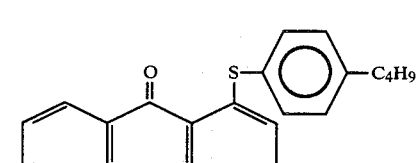 | 590 | 0.65 |

| Dye | $\lambda_{max}$ |
|---|---|
| $H_9C_4O{-}\langle\bigcirc\rangle{-}N{=}N{-}\langle\text{naphthyl}\rangle{-}N{=}CH{-}\langle\bigcirc\rangle{-}OC_4H_9$ | 440 nm |
| $H_9C_4{-}\langle\bigcirc\rangle{-}N{=}N{-}\langle\bigcirc(CH_3)_2\rangle{-}N{=}N{-}\langle\bigcirc(CH_3)_2\rangle{-}N{=}N{-}\langle\bigcirc\rangle{-}N(H)(CH_3)$ | 505 nm |
| $(CH_3)(H)N{-}\langle\text{naphthyl}\rangle{-}N{=}N{-}\langle\bigcirc\rangle{-}N{=}N{-}\langle\bigcirc(CH_3)\rangle{-}N{=}N{-}\langle\text{naphthyl(OCH}_3)\rangle{-}N(H)(CH_3)$ | 585 nm |
| $(CH_3)_2\text{-benzothiazolyl}{-}N{=}N{-}\langle\bigcirc(CH_3)\rangle{-}N{=}N{-}\langle\text{naphthyl}(CH_3)\rangle{-}N(H)(CH_2CH_3)$ | 610 nm |

Curve C is the spectra for the device when an RMS voltage of 15 volts, 1 kHz, is impressed across the electrode surfaces of the cell. The area between the electrodes appears clear and transmits about 70% of light having wave lengths between about 430 and 700 nm. Curve D is the spectra for the device in the absence of an electric field. The device appears black and uniformly absorbs about 85 percent of incident light throughout the region between about 400 and 700 nm.

The following examples illustrate compositions and devices in accordance with the invention.

EXAMPLE 1

The dye

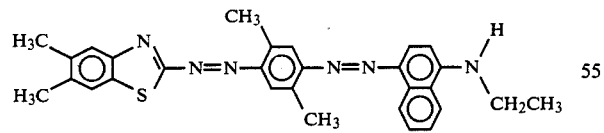

was prepared by the following procedure. Sodium nitrite (1.5 g) was added portionwise to 10 ml of concentrated sulfuric acid. The resulting solution was cooled to 0°–5° C. and 20 ml of 6:1 acetic acid/propionic acid was added dropwise keeping the temperature at less than 15° C.

One half of this mixture was slowly added to 0.01 mole 5,6-dimethyl-2-aminobenzothiazole which was previously dissolved in 50 ml of a solution of 50% cold sulfuric acid in water, and kept at 0° C. When diazotization was complete, a coupling solution was added and the solution was stirred for 15 min. The coupling solution was prepared by dissolving 1.21 grams 2,5-dimethylaniline in 50 ml glacial acetic acid, and cooling this solution to 0° C.

After coupling had occurred the mixture was buffered with the addition of saturated sodium acetate solution and stirred for two hours. Adjusting the pH to neutral with sodium hydroxide, recovery by vacuum filtration, and purification from the reaction components afforded the dye intermediate. Verification by time of flight mass spectroscopy (TFMS), showed that the structure of the intermediate was:

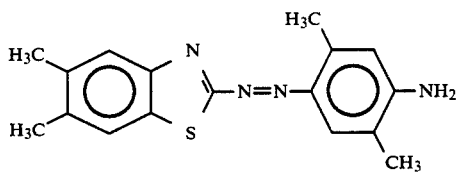

3.1 G of the intermediate was dissolved in 25 ml sulfuric acid and diluted with 50 ml water. After cooling to 0°–5° C., 0.7 grams of sodium nitrite, as nitrosylsulfuric acid, was slowly added to form the clear diazonium solution. After one hour the diazonium solution was stirred into 1.71 grams of N-ethyl-1-naphthylamine in 50 ml of glacial acetic acid at 0° C. Addition of sodium acetate afforded the dichroic dye as green irridescent crystals. Filtration, column chromatography and recovery from heptane, yielded the subject dichroic dye:

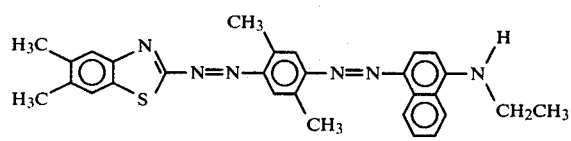

The structure of this dye was confirmed by Nuclear Magnetic Resonance Spectroscopy (NMR).

EXAMPLE 2

The dye

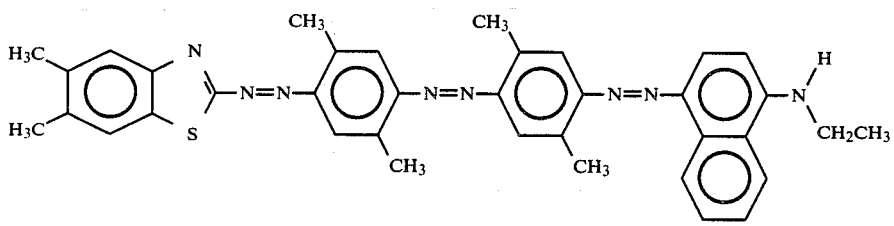

was prepared according to the following procedure. 5,6-Dimethyl-2-amino-benzothiazole (17.8 g, 0.1 mole) was dissolved in 200 ml of a solution of 50% sulfuric acid in water and the mixture was cooled in an ice bath to 0° C. with stirring. Sodium nitrite (6.9 g, 0.1 mole) was slowly added as a 20% solution in concentrated sulfuric acid. When the addition was complete the cold solution was allowed to form the diazonium (about two hours). 2,5-Dimethylaniline (12.1 g, 0.1 mole) was dissolved in 100 ml glacial acetic acid and cooled in an ice bath. When diazotization was complete, 200 g crushed ice was added to the acetic acid solution and the diazotized benzothiazole compound was stirred in, keeping the mass cold. Coupling occurred and anhydrous sodium acetate was stirred in to adjust the solution to a pH of about 5. After an hour the dyestuff product was collected by vacuum filtration, washed and dispersed in 500 ml water. The dyestuff dispersion was then treated with sodium carbonate to render the free base of the intermediate:

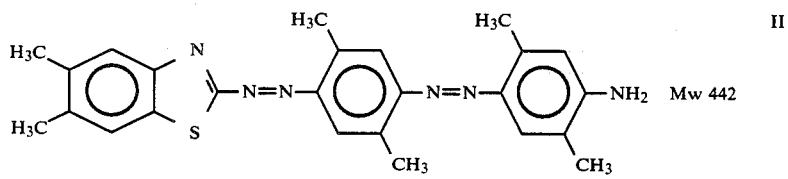

31 G (0.1 mole) of the above compound, I, was dissolved in a minimum quantity of 50 ml glacial acetic/-propionic acid (8:2) and poured into a warmed (40° C.) solution of 50% sulfuric acid in water (150 ml) and cooled to 0° C. in an ice bath. NaNO₂ (6.9 g, 0.1 mole) as a 20% solution in concentrated sulfuric acid was slowly added and the diazonium was formed after two hours at 0° C. 2,5-Dimethylaniline (12.1 g, 0.1 mole) dissolved in 100 ml glacial acetic acid was cooled, 200 g ice was added and the diazonium solution was stirred in. Coupling occurred and the mixture was buffered and converted to the free base as above, yielding:

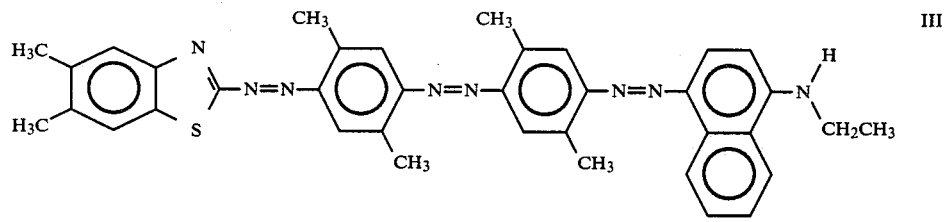

44 G (0.1 mole) of the compound immediately above, II, was dissolved in sulfuric acid solution and diazotized in the conventional manner. 17 G (0.1 M) N-ethyl-1-naphthylamine dissolved in glacial acetic acid was coupled to the diazonium. The dyestuff was neutralized with sodium hydroxide solution, collected on a filter, washed and recrystallized from pyridine/petroleum ether. Column chromatography of the dyestuff resulted in the dichroic dye III in 60% yield The structure of the dye was confirmed by Time of Flight Mass Spectroscopy.

EXAMPLE 3

The dye

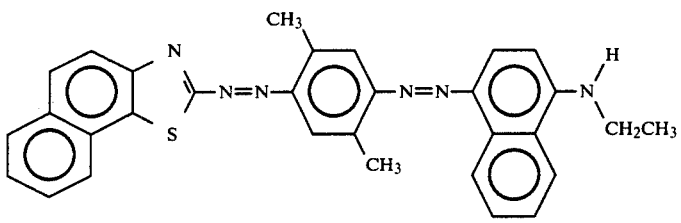

was prepared by the following procedure. Sodium nitrite (1.5 g) was added portionwise to 10 ml of concentrated sulfuric acid. The resulting solution was cooled to 0°–5° C. and 20 ml of 6:1 acetic acid/propionic acid was added dropwise keeping the temperature at less than 15° C.

One half of this mixture was slowly added to 2 grams of 2-aminonaphtho[1,2]thiazole which was previously dissolved in 50 ml of a solution of 50% cold sulfuric acid in water, and kept at 0° C. When diazotization was complete, a coupling solution was added and the solution was stirred for 15 min. The coupling solution was prepared by dissolving 1.21 grams 2,5-dimethylaniline in 50 ml glacial acetic acid, and cooling this solution to 0° C.

After coupling had occurred the mixture was buffered with the addition of saturated sodium acetate solution and stirred for two hours. Adjusting the pH to neutral with sodium hydroxide, recovery by vacuum filtration, and purification from the reaction components afforded the dye intermediate. Verification by time of flight mass spectroscopy (TFMS), showed that the structure of the intermediate was:

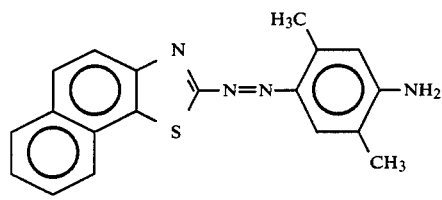

3.3 G of the intermediate was dissolved in 25 ml sulfuric acid and diluted with 50 ml water. After cooling to 0°–5° C., 0.7 grams of sodium nitrite, as nitrosylsulfuric acid, was slowly added to form the clear diazonium solution. After one hour the diazonium solution was stirred into 1.71 grams of N-ethyl-1-naphthylamine in 50 ml of glacial acetic acid at 0° C. Addition of sodium acetate afforded the dichroic dye as green irridescent crystals. Filtration, column chromatography and recovery from heptane, yielded the subject dichroic dye:

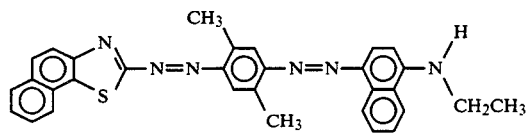

The structure of this dye was confirmed by Nuclear Magnetic Resonanc Spectroscopy (NMR).

EXAMPLES 4–11

The following dichroic dyes were prepared according to the procedure described hereinbelow:

| Ex. No. | Dye Structure |
|---|---|
| 4 | 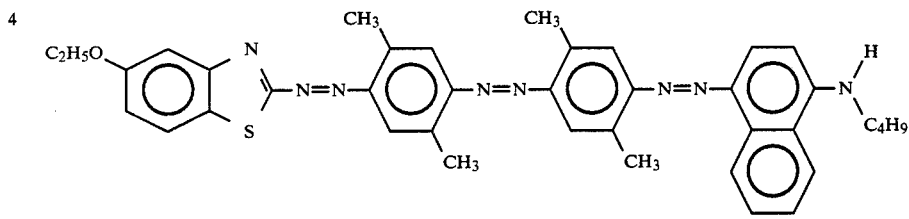 |
| 5 | 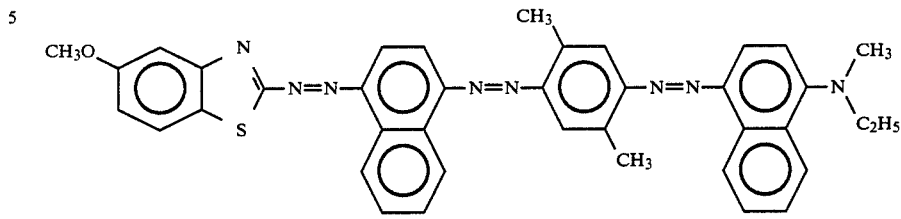 |

6 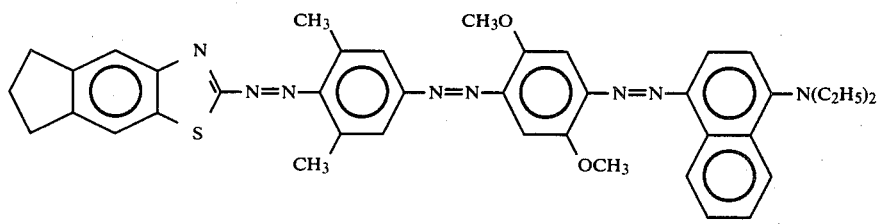
7 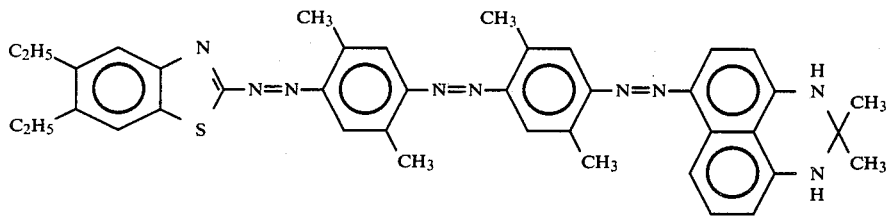
8 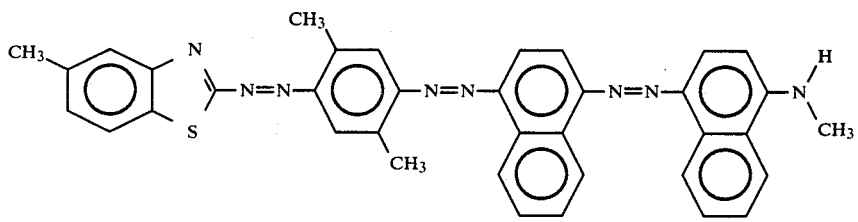
| Dye No. | Dye Structure |
|---|---|
9 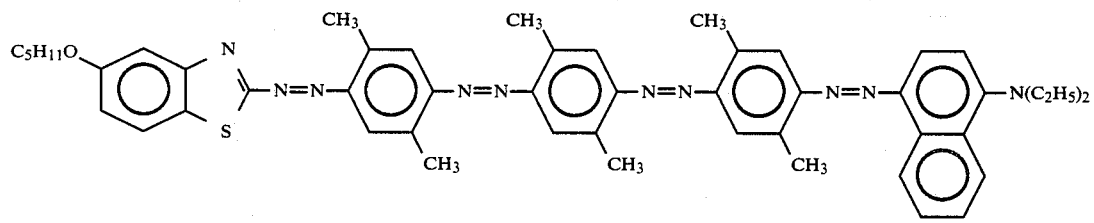
10 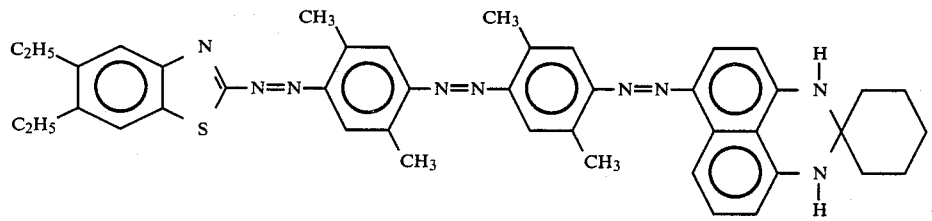
11 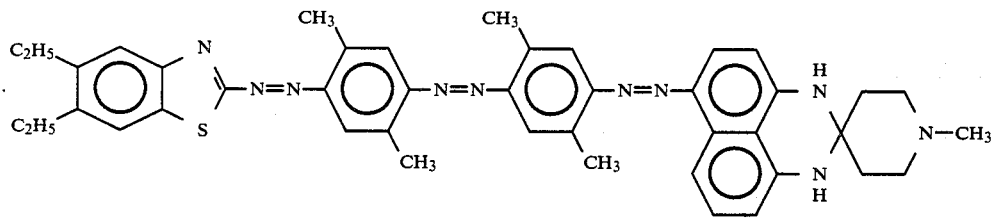

-continued

12 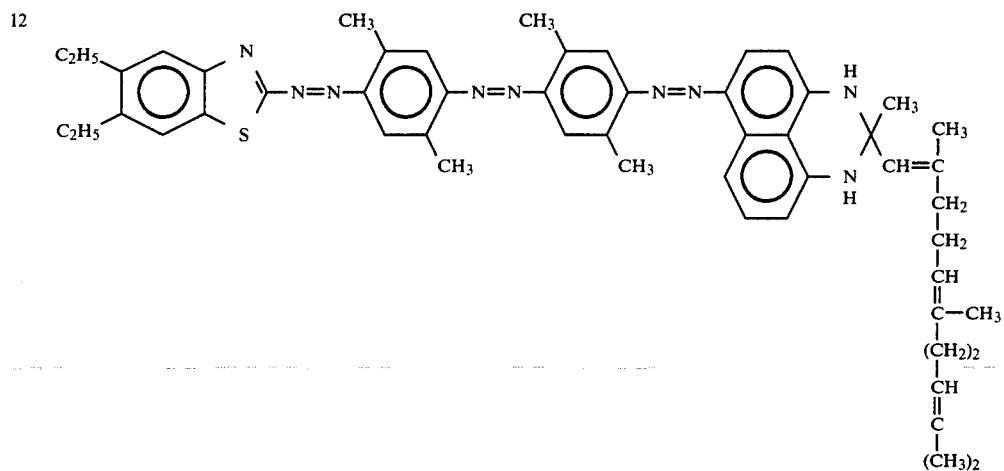

An appropriate amount of a benzothiazole (listed in the table hereinbelow) was dissolved in 100 ml concentrated sulfuric acid by portionwise addition with stirring at room temperature. This solution was cooled to −10° C. in an ice salt bath (500 gm ice/100 gm salt). To this cooled solution as added slowly through a dropping funnel a solution of 1.2 gm of nitrosylsulfuric acid dissolved in 20 gm concentrated sulfuric acid and 10 g of a 7:3 by volume acetic acid/propionic acid solution. The temperature of the mixture was maintained at about 0° C. throughout the addition. The diazotization reaction was allowed to proceed for about 4 hours at about 0°-10° C. The diazotization product was then slowly poured into a solution of an appropriate amount of a first aniline (listed in the table hereinbelow) in 100 ml glacial acetic acid. Coupling was allowed to proceed for 30 minutes at a temperature less than 5° C. After coupling about 50 g of anhydrous sodium acetate was stirred into the solution, followed by the addition of 100 gm of ice. The mixture is allowed to warm to room temperature overnight (about 18 hours). The precipitated sulfate salt of the first dye intermediate was recovered by vacuum filtration and thoroughly washed with water and oven dried.

(0.01 M) of the first intermediate sulfate salt was dissolved in 50 ml concentrated sulfuric acid and this solution was cooled to −10° C. using an ice-salt bath. Diazotization of this dye intermediate was accomplished using 1.20 g nitrosylsulfuric acid in 20 ml of sulfuric acid and 20 ml of a 8:2 by volume solution of acetic acid/propionic acid. The diazotization reaction was allowed to proceed for four hours at about 0°-10° C. The diazotized amine was then slowly poured into a solution of an appropriate amount of a second aniline (listed in the table hereinbelow) in 50 ml glacial acetic acid containing 100 g of ice. While the mixture was kept cold and stirred it is brought to pH 5 with anhydrous sodium acetate and allowed to couple overnight at room temperature (18°-20° C.). Filtration yielded the sulfuric acid salt of the second dichroic dye intermediate.

In the case of dye number 9 the second dye intermediate was again diazotized as above using nitrosylsulfuric acid, and coupled again to the second aniline to yield the sulfuric acid salt of the third dichroic dye intermediate, having three dimethyl phenylazo linkages.

0.01 moles of the sulfuric acid salt of the second dichroic dye intermediate, for Examples 4–8 and 10–12, and the third dichroic dye intermediate, for Example 9, as dissolved in 100 ml of concentrated sulfuric acid by making a paste of the intermediate in water (5–10 ml) and crushing any lumps. This thick paste was stirred portionwise into the sulfuric acid, allowing each quantity, i.e., 1.0 g to go into solution prior to the addition of the next portion. When all the dye intermediate had been added, the stirring solution was cooled to −10° C. in an ice bath. 0.01 moles of nitrosylsulfuric acid was added and the mixture was stirred for 6 hours at −10° C. The diazotization product was coupled with an appropriate amount of a coupler (listed in the table hereinbelow) dissolved in 100 ml glacial acetic acid. The cold diazonium was slowly added to the coupler solution with stirring and the resultant mixture was kept cold. Coupling was allowed to proceed overnight (at room temperature). The mixture was then brought to a pH of 5 using anhydrous sodium acetate and the crude dye was filtered. The crude dye was dispersed in a rapidly stirring solution of 50 gm sodium carbonate in 1 l of water. The neutralized dye precipitated and was recovered by vacuum filtration. The solid material was washed with water until the wash was colorless. The crude dye was dissolved in toluene (50 ml) and chromatographed on a silica column using toluene followed by a 9:1 by volume solution of toluene/methanol, as elutants. The eluted dye was concentrated to half volume on a rotary evaporator and recrystallized by using a large volume (20:1) of n-heptane. The dye product was recovered as a microcrystalline powder by filtration and vacuum drying.

The structure of each dye was confirmed by Time of Flight Mass Spectroscopy and NMR.

When utilized in traditional "guest-host" type liquid crystal display cells the dyes prepared by Examples 3–8 exhibited absorbances with $\lambda_{max}$ in the region above 600 nm, with the voltage off. In addition the dyes had optical order parameters in "E-7", "ROTN 404" and "PCH 1132" liquid crystal materials of greater than 0.7.

| Example No. | Benzothiazole (Amount) | First Aniline (Amount) | Second Aniline (Amount) | Coupler (Amount) |
| --- | --- | --- | --- | --- |
| 4 | 2-amino-5-ethoxy benzothiazole (1.8 g) | 2,5-dimethylaniline (1.21 g) | 2,5-dimethylaniline (1.21 g) | N—(n)butyl-1-amino-naphthalene (1.97 g) |
| 5 | 2-amino-5-methoxybenzothiazole (1.81 g) | α-naphthylamine (1.43 g) | 2,5-dimethylaniline (1.21 g) | N,N'—methylethyl-1-amino-naphthalene (1.85 g) |
| 6 | 2-amino-[5,6]-cyclopropyl-benzothiazole (1.9 g) | 3,5-dimethylaniline (1.21 g) | 2,5-dimethoxyaniline (1.52 g) | N,N'—diethyl-1-amino-naphthalene (1.99 g) |
| 7 | 2-amino-5,6-diethylbenzothiazole (1.82 g) | 2,5-dimethylaniline (1.21 g) | 2,5-dimethylaniline (1.21 g) | 2,3-dihydro-2,3-dihydro-dimethyl-perimidene (1.98 g) |
| 8 | 2-amino-5-methyl-benzothiazole (1.64 g) | 2,5-dimethylaniline (1.21 g) | α-naphthylamine (1.43 g) | N—methyl-1-amino-naphthalene (1.57 g) |
| 9 | 2-amino-5-pentoxybenzothiazole (2.33 g) | 2,5-dimethylaniline (1.21 g) | 2,5-dimethylaniline (1.21 g) | N—pentyl-1-amino-naphthalene |
| 10 | 2-amino-5,6-diethylbenzothiazole (1.82 g) | 2,5-dimethylaniline (1.21 g) | 2,5-dimethylaniline (1.21 g) | 2,3-dihydro-2,2'-penta-methylene-perimidine (2.38 g) |
| 11 | 2-amino-5,6-diethylbenzothiazole (1.82 g) | 2,5-dimethylaniline (1.21 g) | 2,5-dimethylaniline (1.21 g) | 2,3-dihydro-2,2'-(4'-N—methyl-tetramethylene)-perimidine (2.53 g) |
| 12 | 2-amino-5,6-diethylbenzothiazole (1.82 g) | 2,5-dimethylaniline (1.21 g) | 2,5-dimethylaniline (1.21 g) | 2,3-dihydro-2-methyl-2'-hexahydro-farnesyl-methylene-perimidine (3.75 g) |

EXAMPLE 13

A "phase-change" type liquid crystal display which is black in the absence of an electric field and is clear in the presence of an electric field, was constructed as follows.

A display cell was assembled comprising two opposing glass plates coated on their interior surfaces with tin/indium oxides to form a conductive electrode pattern. Overlaying the electrode pattern, a homeotropic orientation layer was created by the vapor deposition of a dielectric silicone monoxide layer about 100 Å thick, at an angle of less than 30°. The cell was provided with a reflectorized backing, and had a 18 μm cell spacing.

A mixture of the following four dyes was prepared, in the concentrations indicated.

| Dye | $\lambda_{max}$ (nm) | % by weight |
| --- | --- | --- |
| $H_9C_4O$—⟨⟩—N=N—⟨⟩—N=CH—⟨⟩—$OC_4H_9$ | 440 | 0.93 |
| $H_9C_4$—⟨⟩—N=N—⟨⟩(CH₃,CH₃)—N=N—⟨⟩(CH₃,CH₃)—N=N—⟨⟩—N(CH₃)₂ | 505 | 0.74 |
| (H,CH₃)N—⟨⟩—N=N—⟨⟩—N=N—⟨⟩(CH₃,OCH₃)—N=N—⟨⟩—N(H,CH₃) | 585 | 0.60 |
| (CH₃,CH₃)⟨⟩(N,S)=N—⟨⟩(CH₃,CH₃)—N=N—⟨⟩(CH₃)—N(H,CH₂CH₃) | | 1.10 |

2 Percent by weight of the above dye mixture was dissolved in "ROTN-404" liquid crystal material and 4 percent by weight of the cholesteric additive "CB-15", which is a +4-(2-methylbutyl)-4'-cyano biphenyl commercially available from Hoffman LaRoche. This mixture was used to fill the display cell.

FIG. 2 illustrates the transmission spectra for the above "phase-change" device using a Beckman Model 5230 ultraviolet-visible spectrometer with a tungsten source. Curve C is the spectra for the device when an RMS voltage of 15 volts, 1 kHz, was impressed across the electrode surfaces of the cell. The cell transmitted more than about 70 percent of the incident light between about 430 and 700 nm, in the area between the electrodes, when in the "on" state. Curve D is the spectra for the device when the voltage is reduced to zero. Very little light is absorbed between about 400 and 650 nm when the cell is in the "off" state.

The contrast ratio of the cell in the "on" and "off" state was determined by the following method. The filled cell was mounted on an optical bench and a collimated tungsten light source located at an angle of 45° with respect to the cell surface, was focused on the display. An intermittent RMS voltage of 5 volts at 1 kHz was impressed across the electrode surfaces of the cell. The electro-optic modulation of the cell was observed via light reflected from the cell to a photometer, available from Spectra Physics Co., Princeton, N.J., fitted with a photopic filter and connected to a time base oscilloscope. The contrast ratio was determined by measuring the reflectance (or "Brightness") in foot lamberts in the "voltage on" and "voltage off" states, and using the following equation:

$$\text{Contrast Ratio} = \frac{\text{Brightness cell on }(v>0)}{\text{Brightness cell off }(v=0)} - 1 = \frac{\text{Transmission cell on}}{\text{Transmission cell off}} - 1$$

The contrast ratio over the range of wave lengths between about 400 and 700 nm was about 10:1.

What is claimed is:

1. A dichroic dyestuff having the formula

Q—A—Z wherein:
  is a poly(arylazo) linking group wherein the aryl comprises 6 to 10 carbon atoms and has 4,4'-azo linkages;
  Q is a bis-substituted aryl thiazyl substituent wherein the aryl comprises 6 to 10 carbon atoms; and
  Z is selected from the group consisting of naphthalene having an alkyl substituted amino in the 4 position, 2,3-dihydro-2,2'-substituted-permidine and julolidine groups.

2. The dichroic dyestuff of claim 1 wherein the poly(arylazo) linking group A has the formula:

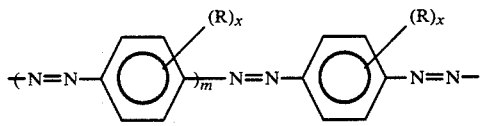

wherein
  m is 0, or an integer from about 1 to 6, and x is independently 0, 1, 2 or 4, provided that where x is 4, the R groups are independently selected from the group consisting of alkyl or alkoxy groups having from about 1 to 8 carbon atoms;
where x is 2, the R groups are independently selected from the group consisting of alkyl or alkoxy groups having from about 1 to 8 carbon atoms, and the two R groups are not substituted on adjacent ring carbon atoms; and
when x is 1, in from 0 to m

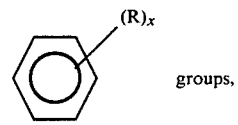

groups,

R is the group —C≡CH—CH≡CH— which is substituted on two adjacent ring carbon atoms.

3. The dichroic dyestuff of claim 1 wherein the bis-substituted aryl thiazyl group Q has the formula:

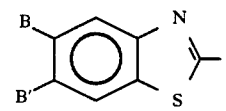

wherein B and B' are independently selected from the group consisting of H, $C_nH_{2n+1}$, $OC_nH_{2n+1}$, phenyl, phenoxy, trifluoromethylsulfonyl, cyano, and thiocyanato, wherein n is an integer from about 1 to 10.

4. The dichroic dyestuff of claim 1 wherein the bis-substituted aryl thiazyl group Q has the formula:

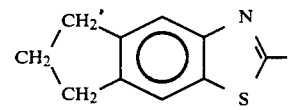

5. The dichroic dyestuff of claim 1 wherein the bis-substituted aryl thiazyl group Q has the formula

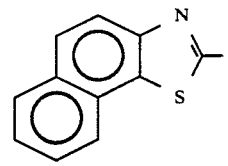

6. The dichroic dyestuff of claim 1 wherein Z has the formula:

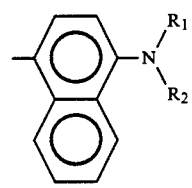

wherein R is selected from the group consisting of H and $C_nH_{2n+1}$ and wherein $R_2$ is $C_nH_{2n+1}$, wherein n is an integer from about 1 to 20.

7. The dichroic dyestuff of claim 1 wherein Z has the formula:

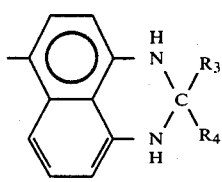

wherein $R_3$ and $R_4$ are independenytly selected from the group consisting of alkyls and alkenes having about 1-20 carbon atoms, aryls, cycloaliphatic and heterocyclic rings, or $R_3$ and $R_4$ are combined and, together with the 2 carbon of the perimidine moiety, form cycloaliphatic or heterocyclic rings, said cycloaliphatic and heterocyclic rings having from 4 to 12 carbon atoms and said rings consisting of atoms selected from the group consisting of carbon, hydrogen, nitrogen, oxygen, and sulfur.

8. The dichroic dyestuff of claim 1 wherein Z is selected from the group consisting of:

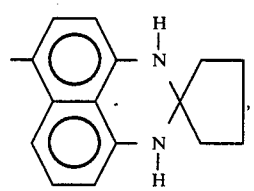

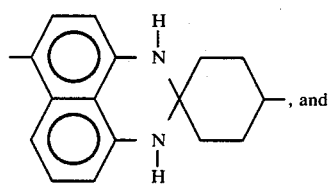, and

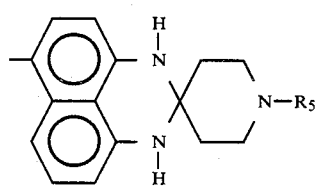

wherein $R_5$ is a lower alkyl having about 1 to 6 carbon atoms, and
wherein the cyclopentyl and cyclohexyl rings are substituted in available positions by groups independently selected from the group consisting of H and lower alkyls having about 1-8 carbon atoms.

9. The dichroic dyestuff of claim 1 wherein Z is a julolidine group having the formula:

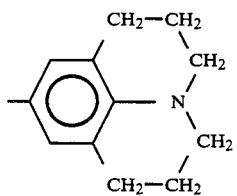

10. A dichroic dyestuff having the formula

Q—A—Z— wherein
A has the formula

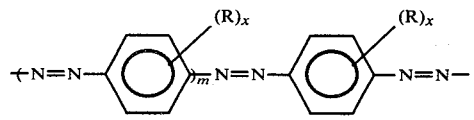

wherein m is 0, or an integer from 1 to 6, and x is independently 0, 1, 2 or 4 provided that
where x is 4, the R groups are independently selected from the group consisting of alkyl or alkoxy groups having from about 1 to 8 carbon atoms;
where x is 2, the R groups are independently selected from the group consisting of alkyl or alkoxy groups having from about 1 to 8 carbon atoms, and the two R groups are not substituted on adjacent ring carbon atoms; and
when x is 1 in from 0 to m

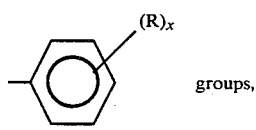 groups,

R is the group —C≡CH—C≡CH—, which is substituted on two adjacent ring carbon atoms;
Q is selected from the group consisting of

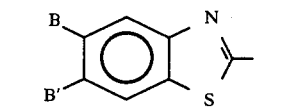

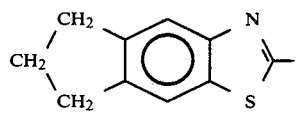

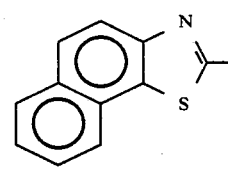

wherein B and B' are independently selected from the group consisting of H, $C_nH_{2n+1}$, $OC_nH_{2n+1}$, phenyl, phenoxy, trifluoromethylsulfonyl, cyano, and thiocyanato, wherein n is an integer from about 1 to 10; and
Z is selected from the group consisting of naphthalene having an alkyl substituted amino in the 4 position, julolidine and 2,3-dihydroperimidine wherein the 2 carbon atom of the perimidine moiety is substituted by groups consisting of alkyls and alkenes having about 1-20 carbon atoms, aryls, and cycloaliphatic and heterocyclic rings, or the 2 carbon atom of the perimidine moiety is substituted with a group which combines with the 2 carbon atom of the perimidine moiety to form a cycloaliphatic or heterocyclic ring said cycloaliphatic or heterocyclic rings having from 4 to 12 carbon atoms and said rings consisting of atoms selected from the group consisting of carbon, hydrogen, nitrogen, oxygen and sulfur.

11. A composition of matter comprising a nematic liquid crystal material and, in admixture therewith, the dichroic dyestuff of claim 1.

12. The composition of claim 11 wherein said composition additionally comprises at least one dichroic dye having maximum absorption at wavelengths between about 400 and 600 nm.

13. The composition of claim 11 wherein said dichrioc dyestuff is present in an amount of about 0.5 to about 5 percent by weight.

14. The composition of claim 11 wherein there is additionally present an optically active compound in an amount sufficient to provide a cholesteric phase.

15. An improved "guest-host" type liquid crystal display device which is responsive to the absence or presence of an electric field, said device comprising a layer of a nematic liquid crystal composition and two conductive electrodes positioned, respectively, adjacent opposing surfaces of said layer, wherein the improvement comprises the presence of a dichroic dyestuff according to claim 1 in admixture with said liquid crystal composition.

16. An improved "guest-host" type liquid crystal display which is responsive to the absence or presence of an electric field, and which appears neutral black in the absence of said electric field and clear in the presence of said electric field, said device comprising:
 (a) a "guest-host" layer comprising a nematic liquid crystal material and a plurality of dichroic dyes which together strongly absorb throughout the region between about 400 and 600 nm; and
 (b) two conductive electrodes positioned, respectively, adjacent opposing surfaces of said layer;
wherein the improvement comprises the presence of a dichroic dyestuff according to claim 1 in admixture with said "guest-host", liquid crystal-dichroic dye mixture.

17. An improved "phase change" type liquid crystal display device which is responsive to the absence or presence of an electric field, said device comprising a layer of a nematic liquid crystal material in admixture with an optically active compound, and two conductive electrodes positioned, respectively, adjacent opposing surfaces of said layer, wherein the improvement comprises the presence of the dichroic dyestuff of claim 1 in admixture with said liquid crystal material.

18. An improved "phase-change" type liquid crystal display device which is responsive to the absence or presence of an electric field, and which appears neutral black in the absence of said electric field and clear in the presence of said electric field, said device comprising:
 (a) a layer of a nematic liquid crystal material in admixture with a plurality of dichroic dyes which together absorb strongly throughout the region between about 400 and 600 nm, and an optically active compound; and
 (b) two conductive electrodes positioned, respectively, adjacent opposing surfaces of said layer;
wherein the improvement comprises the presence of the dichroic dyestuff of claim 1 in admixture with said liquid crystal material.

19. A display device according to claims 15, 16, 17 or 18 wherein said device includes a means for applying an electric field across said electrodes.

* * * * *